United States Patent [19]
Mallary

[11] Patent Number: 5,431,969
[45] Date of Patent: Jul. 11, 1995

[54] METHOD OF MAKING A MAGNETIC MEDIUM FOR LONGITUDINAL RECORDING

[75] Inventor: Michael L. Mallary, Berlin, Mass.

[73] Assignee: Quantum Corporation, Milpitas, Calif.

[21] Appl. No.: 945,706

[22] Filed: Sep. 16, 1992

Related U.S. Application Data

[60] Division of Ser. No. 364,900, Jun. 12, 1989, Pat. No. 5,176,965, which is a continuation-in-part of Ser. No. 103,965, Oct. 5, 1987, abandoned.

[51] Int. Cl.$^6$ .............................................. H01F 10/02
[52] U.S. Cl. .................................. 427/599; 427/129; 427/130; 427/131; 427/132; 427/250; 427/295
[58] Field of Search ............... 427/599, 131, 129, 130, 427/295, 132, 250

[56] References Cited

U.S. PATENT DOCUMENTS

| | | | |
|---|---|---|---|
| 3,393,982 | 7/1968 | Fisher et al. | 29/194 |
| 3,508,887 | 4/1970 | Chezel et al. | 29/183.5 |
| 4,287,544 | 9/1981 | Lazzari | 360/131 |
| 4,611,030 | 11/1986 | Uesaka et al. | 428/607 |
| 4,639,811 | 1/1987 | Diepers et al. | 360/125 |
| 4,656,546 | 4/1987 | Mallory | 360/110 |
| 4,672,493 | 6/1987 | Schewe et al. | 360/125 |
| 4,677,032 | 6/1987 | Robinson | 428/611 |
| 4,687,712 | 8/1987 | Sugita et al. | 428/611 |
| 4,696,831 | 9/1987 | Sakaguchi et al. | 427/48 |
| 4,729,805 | 3/1988 | Alexander et al. | 156/160 |
| 4,735,840 | 4/1988 | Hedgcoth | 428/65 |

FOREIGN PATENT DOCUMENTS

| | | |
|---|---|---|
| 0077069 | 4/1983 | European Pat. Off. |
| 0114076 | 7/1984 | European Pat. Off. |
| 0147126 | 7/1985 | European Pat. Off. |
| 0178685 | 4/1986 | European Pat. Off. |
| 1153069 | 8/1963 | Germany |
| 57-71518 | 4/1982 | Japan |
| 59-72644 | 4/1984 | Japan |
| 60-52919 | 3/1985 | Japan |
| 61-177633 | 8/1986 | Japan |
| 62-204429 | 9/1987 | Japan |
| 8602732 | 6/1987 | WIPO |
| WO89/03112 | 4/1989 | WIPO |

OTHER PUBLICATIONS

T. N. Kennedy; Magnetic Recording Disk with Buried Servo Layer; Dec. 1980; (IBM Technical Disclosure Bulletin, vol. 23, No. 7A; pp. 2949–2950.

Bruyere; "A Coupling Phenomena Between The Magnetisation of Two Ferromagnetic Thin Films Separated by a Thin Metallic Film Application to Magnetic Memories" Apr. 8, 1964.

Croll & Romankiw, Iron, Cobalt and Nickel Plating For Magnetic Applications, IBM Rel. SJ009, circa 1987, (no month avail.).

*Primary Examiner*—Bernard Pianalto
*Attorney, Agent, or Firm*—Fish & Richardson

[57] ABSTRACT

The magnetic medium includes a magnetic under image layer which may be separated from the hard magnetic recording layer by a nonmagnetic buffer layer. Virtual magnetic images induced in the magnetic image layer reduce off-track magnetization seen by the recording head. Thus, interference caused by tracks adjacent to the track being read is reduced.

24 Claims, 2 Drawing Sheets

METHOD OF MAKING A MAGNETIC MEDIUM FOR LONGITUDINAL RECORDING

This is a divisional of application Ser. No. 07/364,900, filed Jun. 12, 1989, now U.S. Pat. No. 5,176,965, which is a continuation in part of Ser. No. 07/103,965, filed Oct. 5, 1987 (now abandoned).

BACKGROUND OF THE INVENTION

This invention relates to a magnetic medium for longitudinal recording which suppresses off-track fringing signals.

As a recording head flies over a track of data, flux from this track and adjacent tracks is detected during a read operation. In many cases, adjacent tracks are separated by a wide enough intertrack space to make the flux reaching the head form an adjacent track insignificant compared to the flux from the track of interest. Adjacent track interference becomes more problematic when track density is high. In this latter case, the track adjacent to the track of interest is sufficiently close that its flux becomes significant.

SUMMARY OF THE INVENTION

According to one aspect of the invention a magnetic medium for longitudinal recording includes a magnetic image layer cooperating with a hard magnetic recording layer. The layers may be separated by a nonmagnetic buffer layer. The image layer may be an underlayer.

It is preferred that the magnetic thickness of the magnetic image layer be greater than the magnetic thickness of the hard magnetic recording layer. A suitable magnetic thickness for the magnetic image layer is approximately 30% thicker than the hard magnetic layer, where the magnetic thickness is equal To the product of the geometric thickness and the remanent magnetization. It is also preferred that the nonmagnetic layer thickness be in the range of 0.5 to 2 times the effective fly height of the magnetic head. In yet another aspect of the invention, the magnetic image layer has low permeability to avoid shorting out the head poles which reduces head efficiency. The image layer in this aspect may also have high coercivity.

In still another aspect of the invention the magnetic image layer has still lower permeability and higher coercivity so as to reduce the negative dip in the signal caused by the leading and trailing edges of the head.

In another aspect of the invention, the head generates magnetic fields during read to saturate the magnetic image layer in the medium so as to cancel the effect of the image charges below the head. This technique will allow the use of very thin buffer layers and will facilitate using a two-pole head to read.

A uniaxial anisotropy may be induced in a radial direction in the magnetic image layer of the medium of this invention. The uniaxial anisotropy may be induced by an applied magnetic field during deposition, by annealing the medium in a magnetic field after deposition, by controlling the angle of incidence during vacuum deposition, or by pretexturing the substrate on which the magnetic image layer is deposited.

DESCRIPTION OF THE PREFERRED EMBODIMENT

Figure 1:
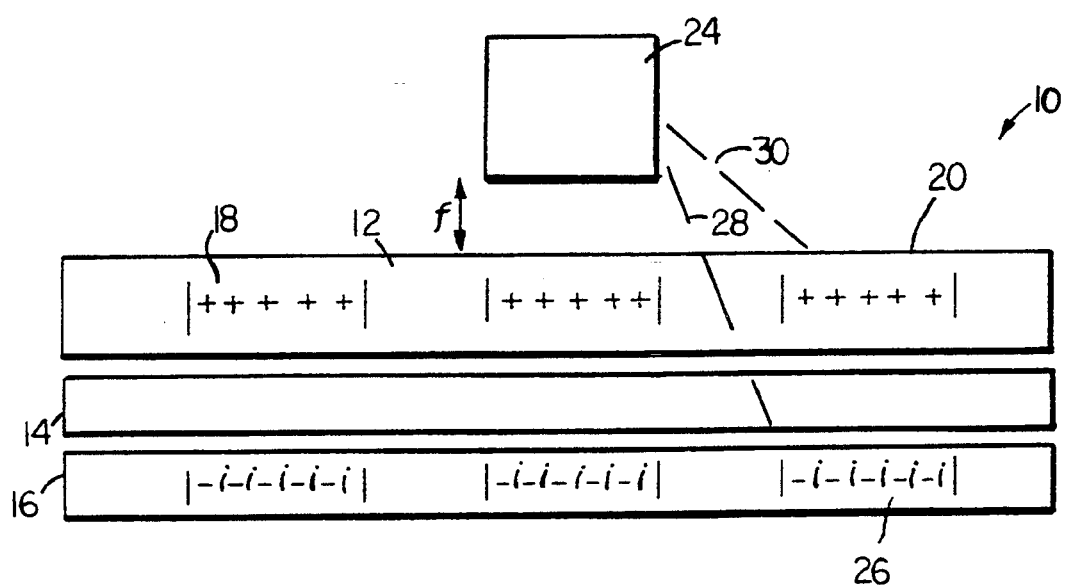

FIG. 1 of the drawing is a cross-sectional view of the magnetic medium, and a head thereover.

Figure 2:
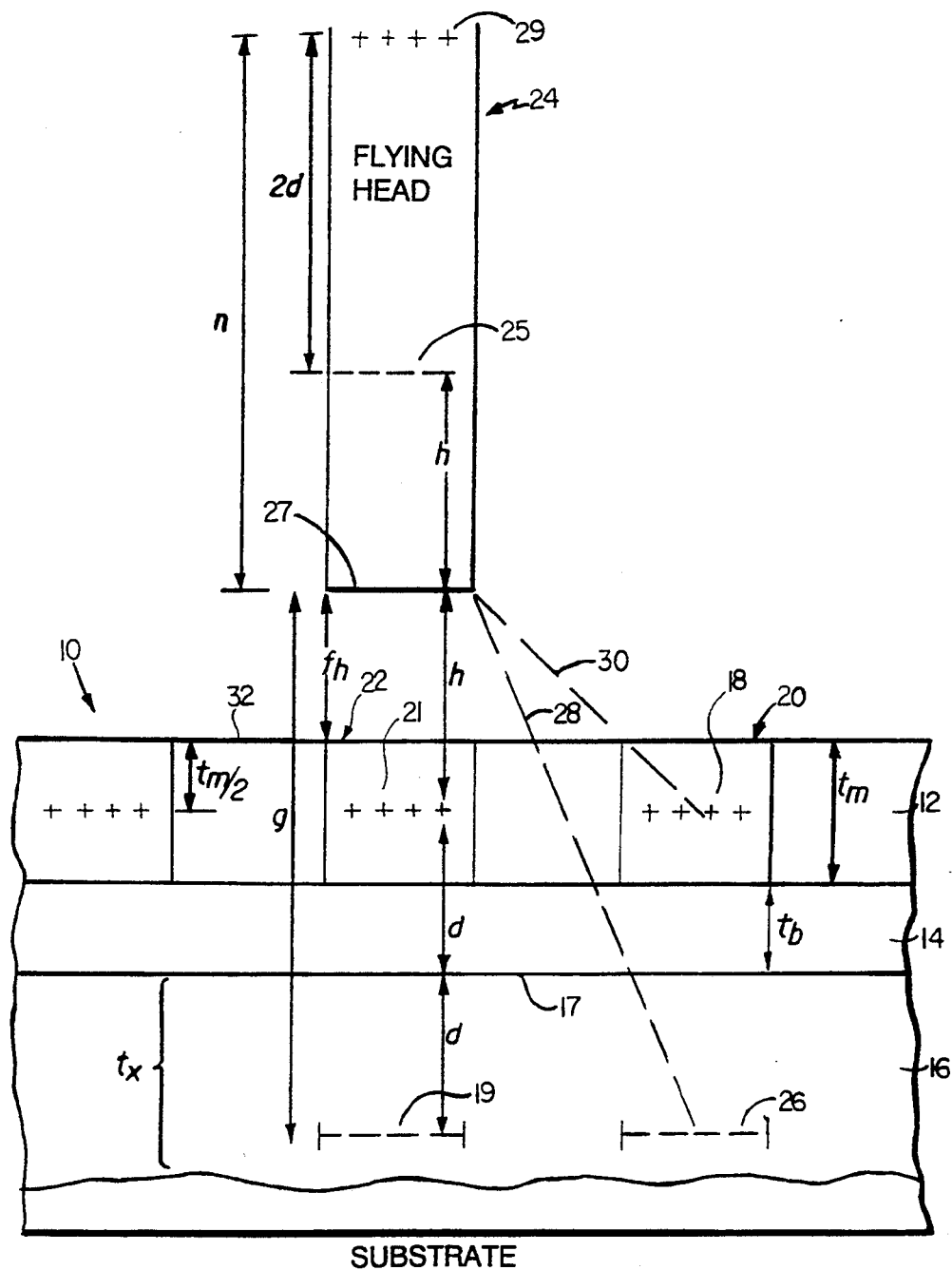

FIG. 2 is an expanded diagram of the embodiment shown in FIG. 1.

In narrow track, high density magnetic readback systems, it is desirable to reduce fringing from tracks adjacent to a track being read. As shown in FIGS. 1 and 2, this can be achieved in a magnetic medium 10 which includes a hard magnetic recording layer 12 of thickness ($T_m$), a nonmagnetic buffer layer 14 of thickness ($t_b$), and a magnetic image layer 16. To understand the effect of the magnetic image layer 16 of thickness ($t_x$), it is best to think in terms of the theory of virtual images. The magnetization of the hard magnetic layer 12 is treated as a series of discrete magnetic charges 18, 21 located at the center ($t_m/2$) from either surface of the hard magnetic layer 12. These "actual charges" 18, 21 (+) located in the hard magnetic layer 12 behave as if they induce negative image charges 19, 26 (−) within the magnetic image layer 16.

The magnetic image layer 16, located below the hard layer 12, is separated from the hard layer 12 by the nonmagnetic buffer layer 14. The distance from the actual charges 18, 21 to the surface 17 of the magnetic image 16 is (d) and is equal to ($t_m/2$) (the distance into the hard layer 12 at which the actual charges are located) plus ($t_b$) (the thickness of the nonmagnetic buffer layer 14). The presence of charges in the hard layer 12, distance (d) away from the surface 17 of the magnetic image layer 16, induces the opposite image charges at the same distance (d) from the surface 17 into the image layer 16.

In conjunction with a conventional medium, charges in a track 20 adjacent to a track 22 beneath a head 24 can interfere with the ability of the head 24 to read the track 22 information accurately. (The medium 10 is generally configured as a disk, and motion of the medium 10 is into or out of the plane of the figure.) As explained above, because of the magnetic image layer 16, charges in the hard magnetic layer 12 at the track 20 induce negative image charges 26 in the magnetic image layer 16. When the thicknesses of the layers 14 ($t_b$) and 16 are small, the distance from the negative image charges 26 related to track 20 to the head 24 is only slightly greater than the distance to the head 24 from the related charges 18 in the hard magnetic layer 12. These distances are illustrated by the dashed lines 28 and 30, respectively. Thus, the signal from the magnetic image layer 16 image charges 26 is almost as strong as that from the actual charges 18 in hard layer 12 but opposite in sign. The two signals nearly cancel any effect on the adjacent track 22 which is being read by the head 24.

When the head 24 is directly above the track 22 of interest, the situation becomes very complex. This is the case because the head is made from a soft, or low coercivity, magnetic material and will have image charges induced in it.

Assume that the head 24 flies above the surface 32 at an effective height (h) above the charges 21 in the hard magnetic layer 12. The presence of magnetic charges 21 in the hard magnetic layer 12 will induce almost equal and opposite image charges 25 in the head 24 at a distance (h) into the head 24 equal to the distance from the head surface 27 to the actual charges 21. Therefore, the image charges 25 in the head will be located at a distance (2h) from the actual charges 21

Further, induced image charges 19 in the magnetic image layer 16 will induce a second set of image charges 29 in the head 24. This second set of head image charges 29 will be nearly equal to and opposite the image charges in the image layer 16, and located at a distance (n) into the head 24 from the surface 27 of the head 24 where (n) is equal to the distance (g) from surface 27 to the image charges in the magnetic image layer 16, where g=h+2d, from the surface 27 of the head 24. Induced virtual charges 25, 29 in the head 24 in turn induce further virtual charges in the magnetic image layer 16 but not shown.

Such inducing of image charges can go on indefinitely with each set of image charges inducing other image charges in its opposite magnetic material. The head thus sees an infinite series of repeating image charges similar in effect to the infinite series of images seen when one looks at the reflection of a mirror in another mirror. Although one would expect such an effect to result in cancellation of the signal from the track of interest, the applicant herein has determined this not to be the case. Analysis indicates only a weak suppression of the high frequency on-track signal (e.g., at 30 kfri, with an effective fly height of 10 microinches and a nonmagnetic buffer layer 14 thickness of 10 microinches, the loss of high frequency amplitude due to the buffer layer is about 12%).

The net effect of the new magnetic medium 10 is that off-track interference is reduced while the signal from the track of interest is only slightly affected. The suppression of low frequency signals is much greater than that of high frequency signals, so the resolution (high frequency amplitude divided by low frequency amplitude) is also improved without resorting to electronic equalization which usually amplifies the noise as well.

The thickness of the nonmagnetic buffer layer 14 may range from zero to roughly the distance of closest approach of the head to an adjacent track. Optimum performance under ordinary conditions will be obtained if the thickness of the nonmagnetic buffer layer ranges from 0.5 to two times the effective fly height. As the nonmagnetic layer is made thinner, off-track signal suppression increases but on-track high frequency amplitude decreases. An engineering tradeoff must be made between these two effects. The magnetic image layer 16 should be greater in magnetic thickness (geometric thickness × remanence) than that of the hard layer (e.g., 30% greater) so that it can absorb a substantial amount of the flux from the off-track signal without saturating. If it is made too thick, however, this layer suppresses the write process in proportion to its thickness.

When a two-pole head is used to read (a three-pole head is preferred), two potential problems may arise. A first problem is that the pole corners will generate strong negative dips (e.g., 25% of the isolated signal for buffer thickness equal to effective fly height). This situation can be remedied either by electronic equalization or by beveling the pole corners so that the dips are softened. A second problem is that the magnetic image layer 16 may tend to short out the poles and reduce the head efficiency. To overcome this problem and reduce the negative dip problem, the permeability of the magnetic image layer 16 can be deliberately reduced. This will decrease the strength of the high order images but will also reduce the pole shorting effect.

The magnetic properties of the magnetic image layer can be varied to both meet the requirements of the recording head in order to reduce the off track fringing and to reduce the dip caused by the trailing edge of the head. Categorizing the combination of permeability ($\mu$) and coercivity ($H_c$) of the magnetic image layer with reference to the "hardness" of the hard recording layer allows the following chart to be created, where permeability ($\mu$) is equal to the ratio of the magnetic saturation field ($M_s$) to anistropy field ($H_k$), where $M_R$ is in Gauss, where $H_c$ is in Oersteds and where the values of $H_c$ in the case of a semi-hard magnetic image layer is determinined by the formula:

$$t_m M_R/2\pi d > H_c > (t_m M_R/2\pi)((1/(2h+d))-(1/(2h+3d)))$$

Here it will be appreciated THAT a hard layer has a permeability of about 1 and a coercivity of 1200 or greater; a semi-hard layer has a permeability of about 1 and a coercivity of between 64 and 500; a semi-soft layer has a permeability of about 20 and a coercivity of less than 2; and a soft layer has a permeability of about 1000 and a coercivity of less than 2.

| "hardness" | $\mu = M_s/H_k$ | Hc | Example |
|---|---|---|---|
| Hard layer | 1 | 1200 | $N_iC_oP_x$ where $y << x$ |
| Semihard image layer | 1 | 64 < Hc < 500 (See formula) | $N_iC_oP_y$ |
| Semisoft image layer | 20 | <2 | $N_iF_eC_o/N_iC_o$ |
| Soft image layer | 1000 | <2 | $N_iF_e$ |

As one moves down the chart, the effect of the image layer varies from cancelling all fringing but having a strong signal attenuation and inducing a strong negative trailing edge dip (in the case of a 2 pole head using a medium with a soft-magnetic image layer) to allowing some fringing to occur but reducing the signal attenuation and the negative trailing edge dip (in the case of semi-hard magnetic image layer with a 2 pole head). With a 3 pole head, the soft underlayer is preferred.

Finally, as another alternative, a weak magnetic field may be applied to the medium during a read, at a strength large enough to saturate the magnetic image layer and so to cancel the effect of the image charges below the head, but not strong enough to affect the hard magnetic recording layer. This technique would allow the use of very thin buffer layers and would also help with the problems associated with using a two-pole head to read.

The magnetic medium according to the invention is made by beginning with a polished Ni—P on aluminum standard substrate. A magnetic image layer such as NiFe is deposited on the substrate. As stated above, the thickness of the magnetic image layer should be approximately 30% greater than the hard magnetic layer to be deposited lazer. A uniaxial anisotropy is induced in a radial direction (the medium will normally be disc-shaped) in the magnetic image layer by applying a field during deposit, by performing an anneal in a magnetic field later, by controlling the angle of incidence in the case of vacuum deposition, or by protexturing the substrate. If a soft magnetic image layer is desired then NiFe is deposited. If a semi-soft magnetic image layer is desired (for two-pole head operation) then a high Hk alloy such as NiFeCo, NiCo, or CoZr is used. Finally, if a semi-hard magnetic image layer is desired, an alloy such as NiCoP is deposited.

A nonmagnetic buffer layer (e.g., Ni—P for plating or Cr for sputtering) is next deposited. The thickness of this layer is in the range of 0.5 to two times the effective fly height. A hard longitudinal magnetic layer is then deposited by conventional means and finally an overcoat is deposited.

The magnetic medium of the present invention reduces fringing at high track density and improves resolution. When a three-pole head is used, the fringing may be so strongly suppressed that the bottom pole can be made significantly oversized. In this way the need for on-wafer track trimming of the whole head is eliminated.

It is recognized that modifications and variations of the present invention will occur to those skilled in the art and it is intended that all such modifications and variations be included within the scope of the appended claims.

What is claimed is:

1. A method for making a longitudinal recording medium for recording information provided by a head that passes over said medium during operation, said method comprising:
   depositing a magnetic layer on a substrate;
   inducing a uniaxial anisotropy in a radial direction in the magnetic layer;
   depositing a nonmagnetic layer on the magnetic layer; and
   depositing a magnetic recording layer on the nonmagnetic layer, and configuring said magnetic recording layer to be magnetically hard relative to said magnetic layer and to record said information from said head in a longitudinal direction therein.

2. The method of claim 1 further comprising inducing said uniaxial anisotropy by applying a magnetic field during deposition of said magnetic layer.

3. The method of claim 1 further comprising inducing said uniaxial anisotropy by annealing the medium in a magnetic field.

4. The method of claim 1 further comprising
   depositing said magnetic layer by vacuum depositing magnetic particles on said substrate, and
   inducing said uniaxial anisotropy by controlling an angle of incidence of said magnetic particles.

5. The method of claim 1 further comprising inducing said uniaxial anisotropy by pretexturing the substrate.

6. A method of making a magnetic recording medium for longitudinal recording of information provided by a head that passes over said medium during operation, said method comprising the steps of:
   a) providing a polished aluminum standard substrate;
   b) depositing a magnetic layer to a selected magnetic thickness on said substrate;
   c) depositing a non-magnetic layer on said magnetic layer to a thickness of between approximately 0.5 and approximately 2 times an effective flying height to which said head passes over said medium;
   d) depositing a magnetic recording layer to a magnetic thickness such that said selected magnetic thickness of said magnetic layer is 30% greater than that of said magnetic recording layer, and configuring said magnetic recording layer to be magnetically hard relative to said magnetic layer and to record said information from said head in a longitudinal direction therein; and
   e) depositing an overcoat layer over said magnetic recording layer.

7. A method for making a magnetic recording medium, comprising
   providing a first magnetic layer configured to record information in a longitudinal direction therein, and
   disposing a second magnetic layer on said first magnetic layer, and configuring said second magnetic layer to be magnetically soft relative to said first magnetic layer and so that all portions of said second layer disposed adjacent to a portion of said information recorded in said first layer remain unsaturated during reading of said portion of said information.

8. The method of claim 7 further including disposing a nonmagnetic layer between said first magnetic layer and said second magnetic layer.

9. The method of claim 8 wherein said medium is adapted for use with a magnetic head positioned at a predetermined effective fly height with respect to said medium, and further comprising providing the nonmagnetic layer with a geometric thickness in the range of 0.5 to two times the effective fly height.

10. The method of claim 8 wherein each one of said magnetic layers has a magnetic thickness equal to a product of a geometric thickness thereof and a remanence thereof, and further comprising providing said second magnetic layer with a magnetic thickness that is greater than the magnetic thickness of said first magnetic layer.

11. The method of claim 10 further comprising providing said second magnetic layer with a magnetic thickness that is approximately 30% greater than that of said first magnetic layer.

12. The method of claim 7 or claim 8 further comprising configuring the second magnetic layer to have low permeability with respect to a permeability of said first magnetic layer.

13. The method of claim 8 wherein the nonmagnetic layer is NiP.

14. The method of claim 7 or claim 8 wherein the second magnetic layer is NiFe.

15. The method of claim 7 or claim 8 wherein the second magnetic layer is NiFeCo.

16. The method of claim 7 or claim 8 wherein the second magnetic layer is NiCo.

17. The method of claim 7 or claim 8 wherein the second magnetic layer is CoZr.

18. The method of claim 8 wherein the nonmagnetic layer is Cr.

19. The method of claim 7 wherein each one of said magnetic layers has a magnetic thickness equal to a product of a geometric thickness thereof and a remanence thereof, and further comprising providing said second magnetic layer with a magnetic thickness that is greater than the magnetic thickness of said first magnetic layer.

20. The method of claim 19 further comprising providing said second magnetic layer with a magnetic thickness that is approximately 30% greater than that of said first magnetic layer.

21. The method of claim 7 further comprising configuring said/second magnetic layer to have a coercivity in the range of 64 to 500 and a permeability of approximately 1.

22. The method of claim 7 or claim 8 further comprising providing the second magnetic layer with a uniaxial anisotropy.

23. The method of claim 22 further comprising orienting the uniaxial anisotropy in a radial direction.

24. A method for making a magnetic recording medium for longitudinal recording of information in a system in which a head passes over the medium during operation, said method comprising disposing a magnetic underlayer on a substrate,
disposing a nonmagnetic layer on said magnetic underlayer, and
disposing on said nonmagnetic layer a magnetic recording layer that is magnetically hard relative to said magnetic underlayer, said magnetic recording layer being configured to record the information in a longitudinal direction therein.

* * * * *